United States Patent
Shannon et al.

(12) 
(10) Patent No.: US 6,422,850 B1
(45) Date of Patent: Jul. 23, 2002

(54) NON-CIRCULAR VENT PIN FOR GOLF BALL INJECTION MOLD

(75) Inventors: Kevin J. Shannon, Longmeadow; Thomas J. Kennedy, III, Wilbraham, both of MA (US); Gary Tavares, Banks, OR (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/692,502

(22) Filed: Oct. 19, 2000

(51) Int. Cl.[7] ......................... B29C 70/70; B29C 45/34; B29C 45/40
(52) U.S. Cl. ..................... 425/116; 425/125; 425/444; 425/546; 425/556; 425/577; 425/812
(58) Field of Search ................................ 425/116, 125, 425/577, 546, 812, 444, 556

(56) References Cited

U.S. PATENT DOCUMENTS

| | | |
|---|---|---|
| D72,693 S | 5/1927 | Beldam |
| 4,090,716 A | 5/1978 | Martin et al. |
| 4,959,000 A | 9/1990 | Giza |
| 5,147,657 A | 9/1992 | Giza |
| 5,406,043 A * | 4/1995 | Banji ..................... 219/69.17 |
| 5,407,341 A | 4/1995 | Endo et al. |
| 5,458,473 A | 10/1995 | Banji |
| 5,824,258 A | 10/1998 | Yamaguchi |
| 5,827,466 A | 10/1998 | Yamaguchi |
| 5,827,548 A | 10/1998 | Lavallee et al. |
| 5,879,599 A * | 3/1999 | Inoue et al. ................. 264/278 |
| 5,890,975 A * | 4/1999 | Stiefel ......................... 473/384 |
| 6,050,803 A * | 4/2000 | Omura et al. ................ 425/116 |

FOREIGN PATENT DOCUMENTS

| | | | |
|---|---|---|---|
| JP | 08-300403 A | * | 11/1996 |
| JP | 10-175219 A | * | 6/1998 |
| JP | 2000-225214 A | * | 8/2000 |

* cited by examiner

Primary Examiner—Robert Davis

(57) ABSTRACT

An improved vent pin for a golf ball injection mold is characterized by a non-circular configuration so that a non-circular dimple can be formed at one or both poles of the golf ball. The vent pin is coaxially arranged within a passage in the injection mold which is aligned with a radius of the ball which passes through one of the poles thereof. The pin is operable between a normal position where the end of the pin closes the passage lower end and a retracted position where the pin end is withdrawn into the passage so that air from a cavity of the mold where the cover layer of the ball is formed can be vented during delivery of thermoplastic material to the cavity to form the golf ball cover.

10 Claims, 2 Drawing Sheets

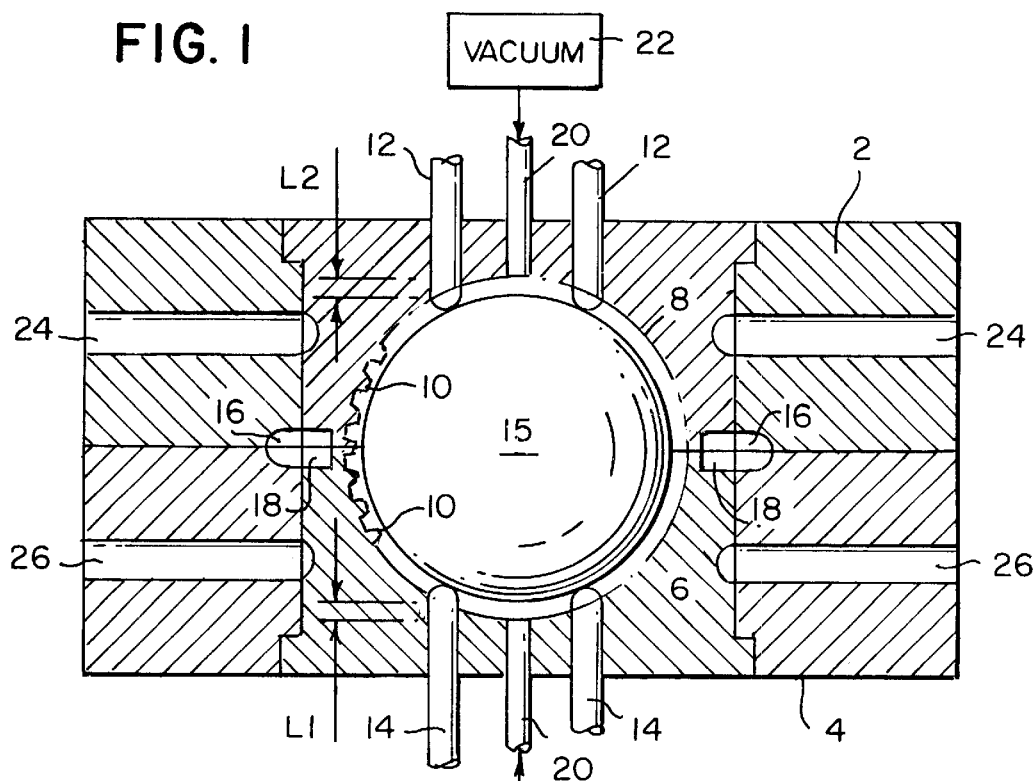
FIG. 1
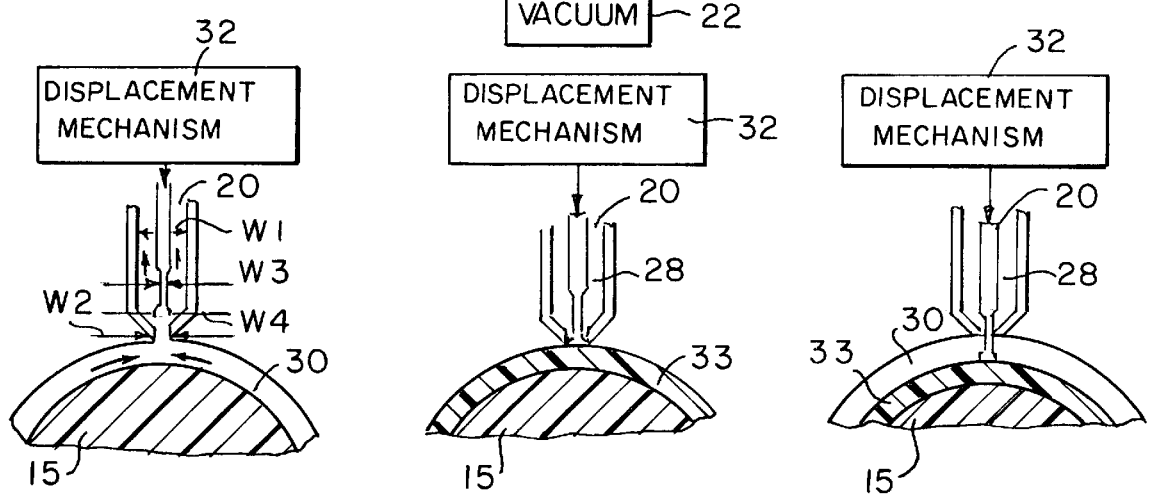
FIG. 2A     FIG. 2B     FIG. 2C
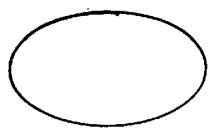  
FIG. 3     FIG. 4

NON-CIRCULAR VENT PIN FOR GOLF BALL INJECTION MOLD

BACKGROUND OF THE INVENTION

In the golf ball manufacturing process, it is common practice to form the cover of the ball using injection molding. A mold comprising a pair of parallel plates containing opposed hemispherical cavities is used to form a spherical cavity within which a golf ball core is suspended by retractable pins. Thermoplastic material is supplied to the cavity along a parting line defined where the hemispherical cavities terminate at the surface of the molding plates. The thermoplastic material surrounds the core to form the cover layer of the ball. Vent pins in the bottom of the hemispherical cavities, i.e. at the poles of the golf ball, allow air to exit the cavity as thermoplastic material is applied thereto. Following evacuation, the vent pins plug the vent openings and form pole dimples on the ball.

BRIEF DESCRIPTION OF THE PRIOR ART

Injection molds for forming golf balls are well-known in the patented prior art. The Lavallee et al U.S. Pat. No. 5,122,046, for example, discloses a retractable pin golf ball injection mold wherein the clearance at the parting line is reduced to prevent a flash line from being formed at the equator of the ball when the mold plates are separated to eject a finished ball therefrom. The Lavallee et al U.S. Pat. No. 5,827,548 improves on the earlier Lavallee et al patent by providing a retractable pin golf ball injection mold wherein a cooling circuit is provided in the mold plates to decrease the setting time of the thermoplastic material, and a two-stage ejector mechanism is provided to independently eject excess thermoplastic material from the runners used to supply the material to the cavities and to eject the finished golf ball from the mold cavity.

Most golf ball injection molds of the prior art include a vent pin to allow air to be evacuated from the cavities as thermoplastic material is being supplied thereto to allow even distribution of the thermoplastic material around the golf ball centers. Because the vent pins have a circular cross-sectional configuration, the pole dimples on the ball are always circular. It has not been possible, therefore, with prior golf ball injection molds to form a dimpled golf ball without having circular dimples at the poles. However, owing to the realization of the influence of dimple configurations on ball flight, many golf balls today are formed with non-circular dimples. It is thus desirable to be able to form a golf ball with an injection molded cover layer wherein all of the dimples, including those at the poles of the ball, have a non-circular configuration.

SUMMARY OF THE INVENTION

Accordingly, it is a primary object of the present invention to provide a vent mechanism for a golf ball injection mold containing a spherical cavity in which a cover layer is applied to a golf ball core to form a dimpled golf ball. The mold contains a vent passage communicating with the spherical cavity and a vent pin is arranged within the passage. The passage extends from the cavity along a radius of the golf ball through one of the poles thereof. The passage has a non-circular end communicating with the cavity, and the pin is operable between a normal position wherein an end of the pin closes the passage lower end and a retracted position wherein the pin end is arranged within the passage and spaced from the cavity to allow air to enter the passage from the cavity as thermoplastic material is supplied to the cavity to form the cover layer on the ball. The pin end has a non-circular cross-sectional configuration corresponding with that of the passage end so that a dimple formed by the pin at the pole of the golf ball has a non-circular configuration.

According to a further object of the invention, the pin is also operable between an extended position wherein the pin end is arranged within the cavity to eject the golf ball therefrom.

Another object of the invention is to form a golf ball having a cover layer containing all non-circular dimples. The cover layer includes two hemispherical surfaces formed by hemispherical cavities of an injection mold. The hemispherical surfaces are identical and are joined at the equator of the golf ball. Each hemispherical surface includes a plurality of first non-circular dimples formed by projections on the surfaces of the hemispherical cavities and a second non-circular dimple formed at the pole of the golf ball, the pole dimple being formed by a non-circular vent pin of the mold. Preferably, none of the dimples overlap. They may have the same or different configurations and sizes.

BRIEF DESCRIPTION OF THE FIGURES

Other objects and advantages of the invention will become apparent from a study of the following specification when viewed in the light of the accompanying drawings, in which:

FIG. 1 is a sectional view of a golf ball injection mold apparatus including a non-circular vent pin according to the invention;

FIGS. 2A–2C are partial schematic views showing the displacement of the vent pin of the invention between retracted, normal, and extended positions, respectively;

FIG. 3 is a bottom view of the vent pin showing an oblong configuration of the pin end;

FIG. 4 is a bottom view of the vent pin showing an elliptical configuration of the pin end.

DETAILED DESCRIPTION

Figure 5:
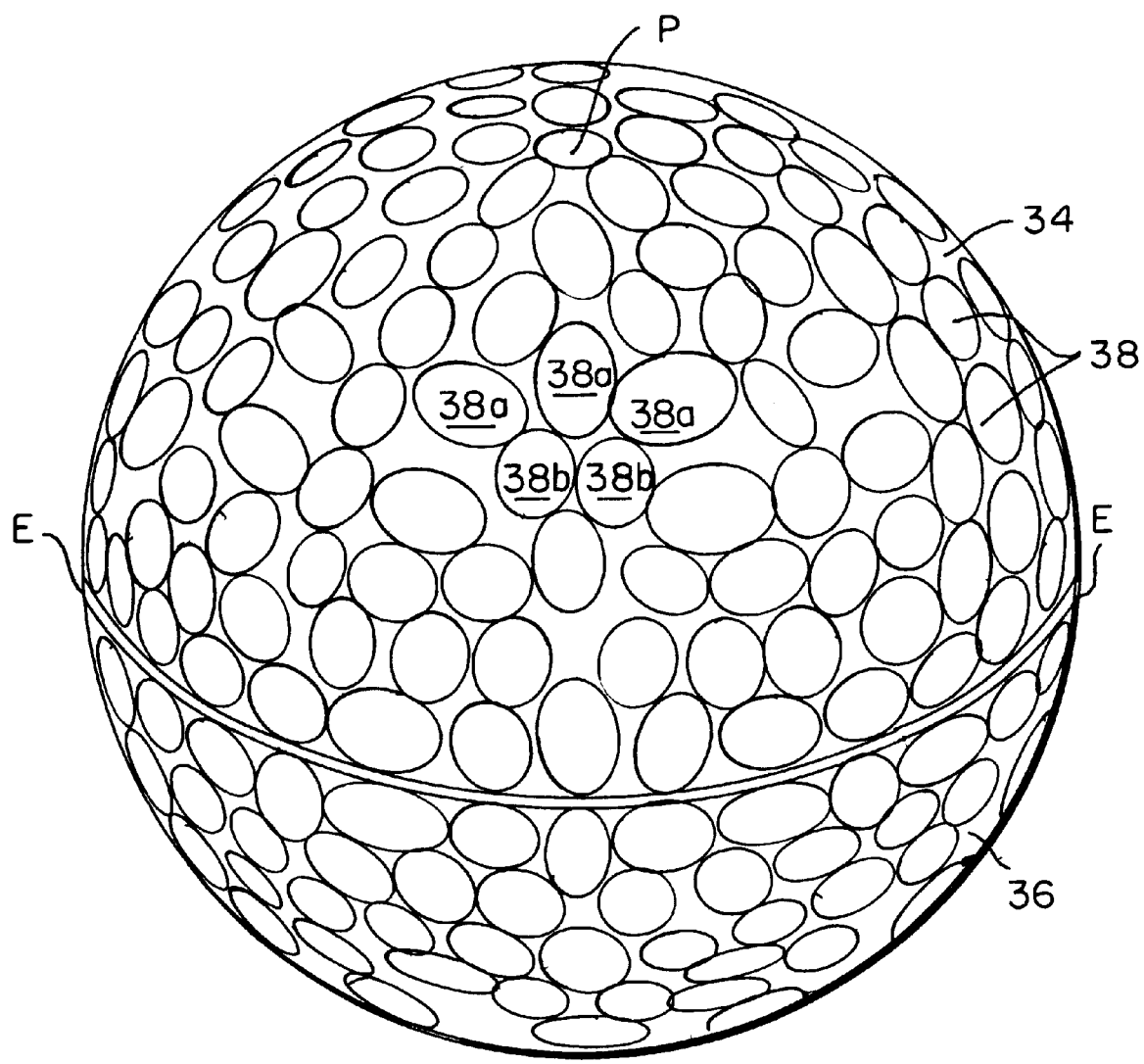
FIG. 5 is a plan view of a golf ball according to the invention with non-circular dimples on the ball surface, including at the poles of the ball.

As shown in FIG. 1, a golf ball injection mold according to the invention includes upper 2 and lower 4 plates which can be displaced relative to one another in a conventional manner between the contiguous position shown and a spaced position. The lower plate 4 includes at least one hemispherical cavity 6 in the upper surface thereof, while the upper plate 2 includes a corresponding hemispherical cavity 8 in the lower surface thereof. A parting line is defined where each hemispherical cavity terminates with the corresponding surface. When the plates are brought together in contiguous relation as shown, the respective upper and lower hemispherical cavities cooperate to define a spherical cavity for forming a golf ball.

Each hemispherical cavity includes a patterned surface 10 which will define a dimple pattern in the outer surface of the golf ball. The upper hemispherical cavity 8 also includes a plurality of retractable core pins 12 and the lower hemispherical cavity 6 includes a plurality of retractable core pins 14. The pins have axes perpendicular to the parting line of the respective plates and are extensible into the spherical cavity to support a golf ball core 15 during the injection molding process. Extension and retraction of the core pins is accomplished through displacement of a conventional piston mechanism (not shown).

In order to supply fluid cover material such as thermoplastic material to the cavity, a runner is provided in the upper and lower plates. The runner 16 comprises a network of feeder lines in the surfaces of the upper and lower plates which define flow channels when the plates are in contiguous relation. The runner is connected with each cavity via gates 18 at the parting line. Accordingly, thermoplastic material is supplied to the cavity at various locations around the parting line for even distribution about the core of the golf ball. Vent pins 20 are provided at the bottom of the upper and lower hemispherical cavities to evacuate air from the spherical cavity as thermoplastic material is supplied thereto. If desired, a vacuum 22 may be connected with each vent pin 20 to assist in drawing air from the cavity so that the thermoplastic material may be more evenly distributed around the ball core for even coverage thereof. To decrease the time required for cooling and setting of the thermoplastic material on the golf ball core, a coolant such as water is supplied adjacent to each cavity via channels 24, 26 in the upper and lower plates, respectively.

Each vent pin is arranged in a passage in the mold plates, the passage and the axis of the pins being aligned with a radius of the golf ball that passes through the poles of the ball. All of the vent pins have a similar structure, so only one vent pin will be described in greater detail in connection with FIGS. 2A–2C. The interior of the passage 28 has two widths, W1 and W2. The greater width W1 is spaced from the spherical cavity 30 and the narrower width W2 is adjacent the spherical cavity. The pin also has two widths W3 and W4. The width W3 is remote from the free end of the pin and is less than the width W4 which is at the end of the pin. The width W4 corresponds generally with the width W2 so that the pin end can pass through or close the end of the passage.

More particularly, the pin is displaced relative to the passage 28 by a displacement mechanism 32 between a retracted position shown in FIG. 2A where the pin is within the passage and the pin end is spaced from the spherical cavity, a normal position shown in FIG. 2B where the pin end closes the end of the passage, and an extended position shown in FIG. 2C where the pin end is arranged beyond the passage and in the spherical cavity. With the pin in the retracted position shown in FIG. 2A, air from the cavity 30 is vented into the passage during delivery of thermoplastic material to the cavity to form the golf ball cover layer 33 on the golf ball core 15. When the cavity has been filled, the displacement mechanism 32 moves the pin to its normal position shown in FIG. 2B to close the opening to the passage. Following curing of the cover layer 33, the displacement mechanism 32 moves the pin to the extended position to eject a golf ball from the cavity.

Preferably, when the pin is in the normal position of FIG. 2B, the pin end protrudes slightly into the spherical cavity to form a dimple on the pole of the golf ball. The pin end bottom surface thus is preferably convex. Unlike conventional vent pins, however, the pin of the present invention is non-circular, as is the opening to the passage from the spherical cavity. Accordingly, non-circular dimples are formed at the poles of the golf ball. Examples of non-circular pins are shown in FIGS. 3 and 4 wherein oblong and elliptical vent pins are shown, respectively. Of course, any desired non-circular shape may be provided for the pin, including star, tear-drop, and geometrical configurations to form correspondingly shaped dimples at the poles.

The resulting golf ball is shown in FIG. 5. The ball has two hemispherical surfaces 34, 36 formed by the hemispherical cavities 6, 8 in the mold plates. The surfaces meet at the equator E of the ball where the parting line is formed. The pole dimples P formed by the non-circular vent pins are also non-circular. In the example of FIG. 5, the pole dimple is elliptical. Non-circular dimples 38 are formed in the ball surface by the patterns 10 in the hemispherical cavities. If desired, all of the dimples on the ball surface may have the same configuration and size. Alternatively, different sized dimples may be provided. Moreover, a combination of differently configured dimples may be provided on the ball surface. In FIG. 5, the dimples 38*a* are elliptical and the dimples 38*b* are oblong. The dimples can be arranged in a repeatable pattern in each hemisphere, so long as both hemispheres have the same pattern and configurations of dimples.

The golf ball according to the invention having all non-circular dimples, including the pole dimples, has different flight characteristics than traditional golf balls having circular dimples. These characteristics reduce hooking or slicing of the ball in flight and also increase the distance that a ball will carry.

While the preferred forms and embodiments of the invention have been illustrated and described, it will be apparent to those of ordinary skill in the art that various changes and modifications may be made without deviating from the inventive concepts set forth above.

What is claimed is:

1. A vent mechanism for a golf ball injection mold containing a spherical cavity in which a cover layer is applied to a golf ball core to form a dimpled golf ball, comprising a solid pin coaxially arranged within a passage in the injection mold, the passage extending from the cavity along a radius of the golf ball through one of the poles thereof and having a non-circular end communicating with the cavity, said pin being operable between a normal position wherein an end of said pin closes said passage lower end, a retracted position wherein said pin end is arranged within said passage and spaced from the cavity to allow air to enter said passage from the injection mold cavity, and an extended position wherein said pin end is arranged within the cavity to eject a golf ball therefrom, said pin end having a non-circular cross-sectional configuration corresponding with that of said passage end, whereby a dimple formed by said pin at the pole of the golf ball has a non-circular configuration.

2. A vent mechanism for a golf ball injection mold as defined in claim 1, and further comprising means for displacing said pin between said extended, normal and retracted positions.

3. A vent mechanism for a golf ball injection mold as defined in claim 2, wherein said pin end has a convex configuration.

4. A vent mechanism for a golf ball injection mold as defined in claim 3, wherein said pin end has an oblong cross-sectional configuration.

5. A vent mechanism for a golf ball injection mold as defined in claim 3, wherein said pin end has an elliptical cross-sectional configuration.

6. An injection mold for applying a cover layer to golf balls, comprising (a) upper and lower support plates each containing at least one hemispherical cavity, said upper and lower hemispherical cavities being adapted to mate to define at least one spherical cavity in which a core of a golf ball is supported when said plates are brought together;

(b) means for supplying cover material to said cavities to form a cover on the golf ball core, and (c) means for venting air from said cavities as cover material is supplied thereto, each of said venting means comprising a pin arranged within a vent passage to said plates communicating with said spherical cavities, respectively, said pin having an axis extending along a radius of said cavity through a pole of the golf ball being formed therein, said pin being operable between a normal position wherein an end of said pin closes an end of said passage adjacent to said cavity, a retracted position wherein said pin end is arranged within said passage and spaced from said cavity to allow air to enter said passage from the cavity, and an extended position wherein said pin end is arranged in said cavity to eject a golf ball therefrom, said pin end having a non-circular cross-sectional configuration, whereby a dimple formed by said pin at the pole of the golf ball has a non-circular configuration.

7. An injection mold as defined in claim 6, and further comprising means for displacing said pin between said extended, normal and retracted positions.

8. An injection mold as defined in claim 7, wherein said pin end has a convex configuration.

9. An injection mold as defined in claim 8, wherein said pin end has an oblong cross-sectional configuration.

10. An injection mold as defined in claim 8, wherein said pin end has an elliptical cross-sectional configuration.

\* \* \* \* \*